(12) United States Patent
Kao et al.

(10) Patent No.: US 7,355,948 B2
(45) Date of Patent: Apr. 8, 2008

(54) DETECTOR FOR DETECTING INFORMATION CARRIED BY A SIGNAL HAVING A SAWTOOTH-LIKE SHAPE

(75) Inventors: Hsueh-Wu Kao, Hsin Chu County (TW); Chun-Nan Chen, Taipei (TW)

(73) Assignee: Mediatek Inc., Hsin Chu (TW)

( * ) Notice: Subject to any disclaimer, the term of this patent is extended or adjusted under 35 U.S.C. 154(b) by 637 days.

(21) Appl. No.: 10/893,333

(22) Filed: Jul. 19, 2004

(65) Prior Publication Data
US 2005/0018576 A1    Jan. 27, 2005

(30) Foreign Application Priority Data
Jul. 25, 2003    (TW) .............. 92120421 A

(51) Int. Cl.
*G11B 5/09*    (2006.01)
(52) U.S. Cl. ................ 369/59.17; 369/47.27
(58) Field of Classification Search ............. None
See application file for complete search history.

(56) References Cited

U.S. PATENT DOCUMENTS 5,982,231 A * 11/1999 Nalbant ............... 330/10

6,678,223 B2 * 1/2004 Tobita et al. ........... 369/47.22
6,809,997 B2 * 10/2004 Park et al. ............. 369/47.1
2002/0159351 A1 * 10/2002 Tateishi .................. 369/47.45

FOREIGN PATENT DOCUMENTS

JP    11-306685 A    11/1999

* cited by examiner

*Primary Examiner*—William Korzuch
*Assistant Examiner*—Joseph Haley
(74) *Attorney, Agent, or Firm*—Birch, Stewart, Kolasch & Birch, LLP

(57) ABSTRACT

A detector for detecting information carried by a signal having a sawtooth-like shape. The detector includes a low-pass filter for receiving the wobble signal and filtering the wobble signal to generate a filtered signal, a comparator for comparing the wobble signal with the filtered signal and generating a compared signal, and a detecting unit for receiving the compared signal and generating a bit signal according to the duty cycle of the compared signal. The bit signal is a first value when the duty cycle of the compared signal is greater than a predetermined value, and the bit signal is a second value when the duty cycle of the compared signal is smaller than the predetermined value.

6 Claims, 7 Drawing Sheets

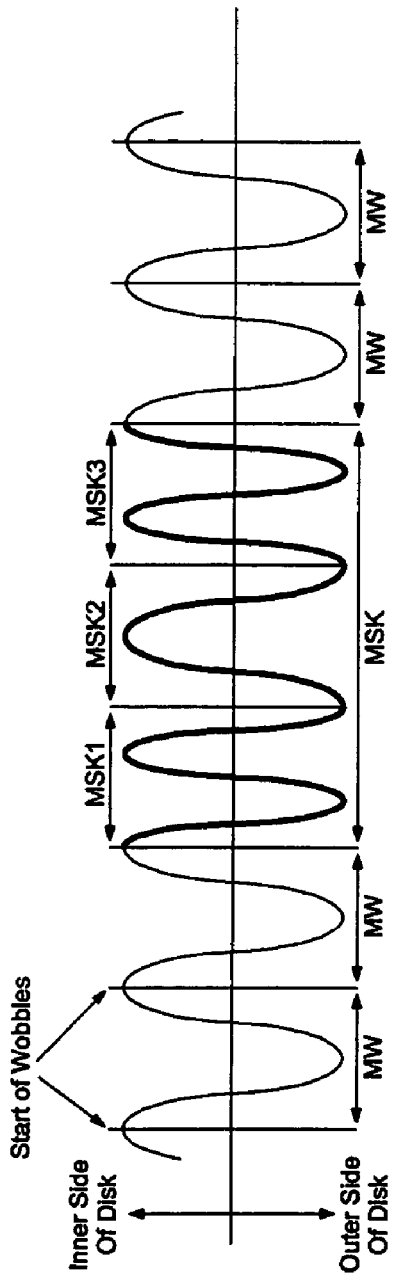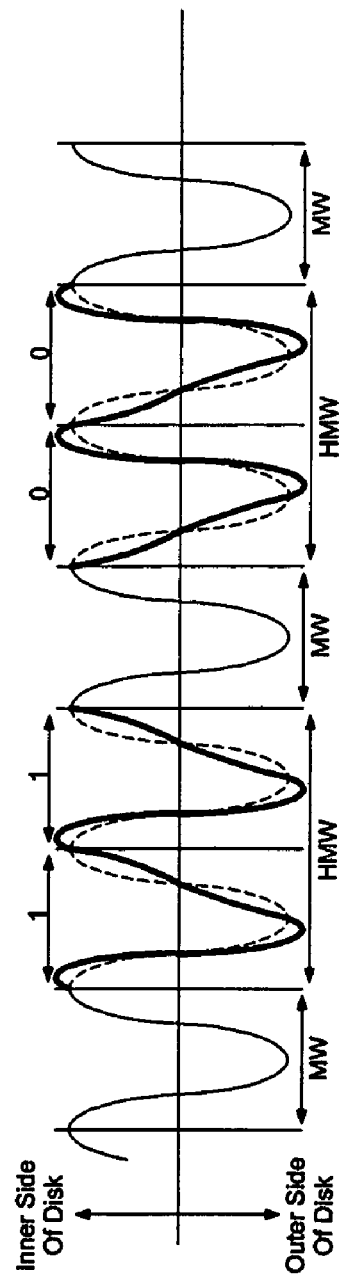

DETECTOR FOR DETECTING INFORMATION CARRIED BY A SIGNAL HAVING A SAWTOOTH-LIKE SHAPE

This application claims the benefit of the filing date of Taiwan Application Ser. No. 092120421, filed Jul. 25, 2003, the content of which is incorporated herein by reference.

BACKGROUND

The invention relates to a detector for detecting information carried by signal having a sawtooth-like shape, and more particularly to a detector having a filter and a comparator to detect the information carried by a signal having a sawtooth-like shape.

Along with advances in optical disc technologies, a new generation of the optical disc rewritable format that is defined as the Blu-Ray has been developed. The track groove in the Blu-Ray optical disc has a wobble shape, and the basic wobble pattern of the track groove is a sine/cosine wave. In the Blu-Ray optical disc, one nominal wobble length (referred to as NWL hereinafter) is equivalent to 69 channel bits, which is the minimum record unit of the Blu-Ray optical disc.

The basic pattern of the wobble is a cosine wave: $\cos\{2\pi^* f_{wob}^* t\}$, where $f_{wob}$ denotes the basic frequency of the wobble. Wobbles in this basic shape are called "Monotone Wobbles" (MW). In addition, some wobbles are modulated in order to carry the address information which are referred to as the ADIP (Addresses in Pre-groove), of some record units on the disc, wherein two modulation methods are involved. The first modulation method is the minimum shift keying—cosine variant (referred to as MSK-cos hereinafter), and the second method is the harmonic modulated wave (referred to as HMW hereinafter).

FIG. 1 shows the definition of the MSK mark (referred to as MM hereinafter). As shown in FIG. 1, one MSK mark consists of three NWLs with the following wobble patterns:

a first NWL starts MSK mark with a cosine wobble with a frequency $1.5^* f_{wob}$, and is given by $\cos\{2\pi^*(1.5^* f_{wob})^* t\}$;

a second NWL continues the MSK mark with a cosine wobble with a frequency $f_{wob}$, and is given by $-\cos\{2\pi^* f_{wob}^* t\}$; and a third NWL terminates the MSK mark with a cosine wobble with a frequency $1.5^* f_{wob}$, and is given by $-\cos\{2\pi^*(1.5^* f_{wob})^* t\}$.

FIG. 2 shows the definition of the sawtooth wobble (referred to as STW hereinafter), which is a wobble having a sawtooth-like shape. A STW is formed by combining the basic cosine wave and a sine wave of the double frequency and is given by:

$\cos\{2\pi^* f_{wob}^* t\} \pm a^* \sin\{2\pi^*(2^* f_{wob})^* t\}$ in which $a=0.25$.

Such a combination of a cosine signal with the basic frequency $f_{wob}$ and a weighted second harmonic signal forms a sawtooth-like waveform. The "+" or "−" sign creates the left or right inclination of the waveform, where the "+" sign is used to represent a bit information of logic one, while the "−" sign is used to represent a bit information of logic zero.

FIG. 3 shows the typical ADIP structure of the Blu-Ray optical disc. The data to be recorded onto the optical disc must be aligned with the ADIP addresses which are modulated in the wobble. As shown in FIG. 3, 56 NWLs correspond to two recording frames and each group of 56 NWLs is called an ADIP unit. Each recording frame includes 1932 channel bits containing a sync filed and a data field. Moreover, two adjacent ADIP units are separated by a recording frame having a period of about 9.5 wobble cycles.

FIG. 4 shows the format of an ADIP unit. As shown in FIG. 4, the following types of ADIP units are defined:

monotone unit: consisting of 1 MM followed by 53 MW;
reference unit: consisting of 1 MM followed by 15 MW, 37 STW, and 1 MW;
sync_0 unit: consisting of 1 MM followed by 13 MW, 1 MSK mark, 7 MW, 1 MM, and 27 MW;
sync_1 unit: consisting of 1 MM followed by 15 MW, 1 MSK mark, 7 MW, 1 MM, and 25 MW;
sync_2 unit: consisting of 1 MM followed by 17 MW, 1 MM, 7 MW, 1 MM, and 23 MW;
sync_3 unit: consisting of 1 MM followed by 19 MW, 1 MM, 7 MW, 1 MM, and 21 MW;
data_1 unit: consisting of 1 MM followed by 9 MW, 1 MM, 3 MW, 37 STW, and 1 MW; and
data_0 unit: consisting of 1 MM followed by 11 MW, 1 MM, 1 MW, 37STW, and 1 MW.

The four kind of sync units are used for synchronization purpose, the data_1 unit is used to represent a bit information of logic one, and the date_0 unit is used to represent a bit information of logic zero. Hence, the ADIP addresses on the optical disc are positioned according to the unit types of the above-mentioned ADIP unit. So, in order to judge the unit types of the ADIP unit correctly, it is an important subject to correctly detecting the information carried by the STW.

SUMMARY

It is therefore an object of the invention to provide a detector for detecting the bit information carried by the sawtooth wobble.

The invention achieves the above-identified object by providing a detector for detecting the information carried by the sawtooth wobble. The detector includes a low-pass filter for receiving the wobble signal and generating a filtered signal, a comparator for comparing the wobble signal with the filtered signal and generating a compared signal, and a detecting unit for receiving the compared signal and generating a bit signal according to the duty cycle of the compared signal. The bit signal is set to a first value when the duty cycle of the compared signal is greater than a predetermined duty cycle, and the bit signal is set to a second value when the duty cycle of the compared signal is smaller than the predetermined duty cycle.

BRIEF DESCRIPTION OF THE DRAWINGS

FIG. 1 shows the definition of the MSK mark.

FIG. 2 shows the definition of the sawtooth wobble.

DETAILED DESCRIPTION

The detector of the invention for detecting information carried by a wobble signal having a sawtooth-like shape will be described with reference to the accompanying drawings.

The operational principle of the invention is to utilize a low-pass filter to filter out the high-frequency of the wobble signal wherein the 3 dB cut-off frequency of the low-pass filter is roughly close to the inverse of a time period during which the wobble signal carries a bit information. Then, a comparator is used to compare the filtered signal with the wobble signal, and outputs a compared signal. A bit signal representing bit information carried by the sawtooth wobble is generated according to the duty cycle of the compared signal. The bit signal is set to a first value when the duty cycle of the compared signal is greater than a predetermined value, such as 50%, and the bit signal is set to a second value when the duty cycle of the compared signal is less than the predetermined value.

Figure 3:
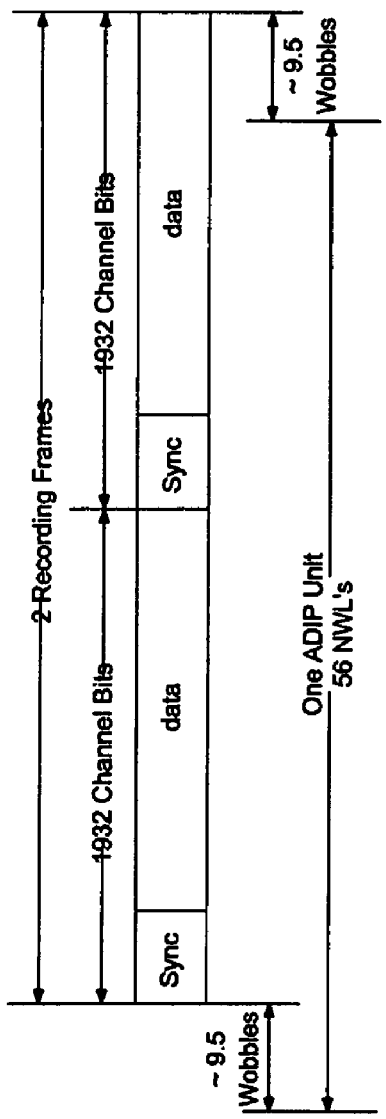
FIG. 3 shows the architecture of the ADIP information of the Blu-Ray optical disc.
Figure 4:
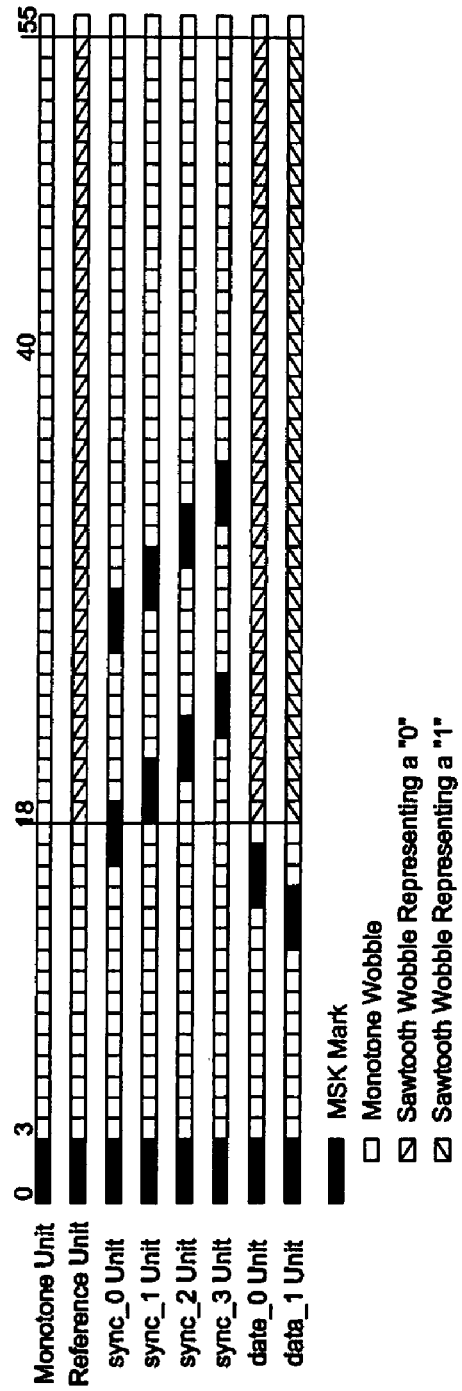
FIG. 4 shows the format of the ADIP unit.
Figure 5:
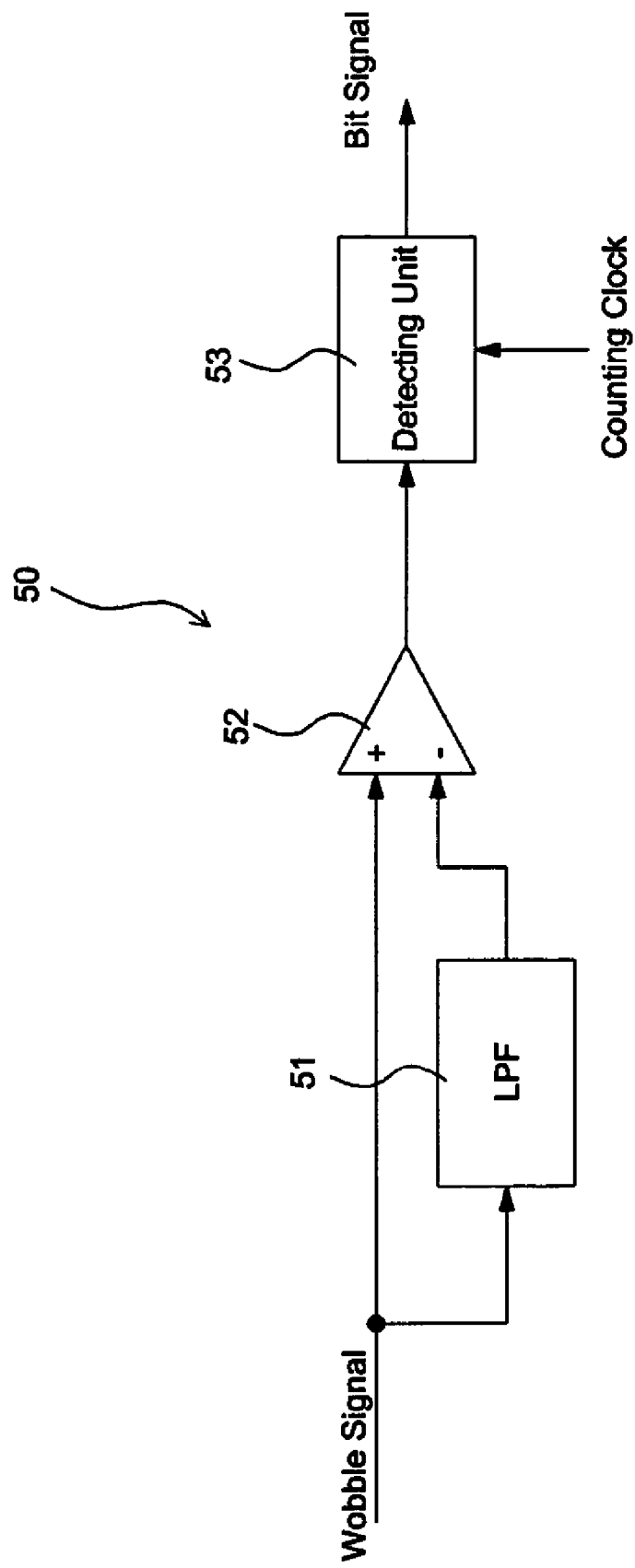
FIG. 5 illustrates a block diagram of the detector for detecting the information carried by sawtooth wobble.

FIG. 5 illustrates the block diagram of the detector of the present invention for detecting information carried by the sawtooth wobble. Referring to FIG. 5, a detector 50 of the present invention is used to detect the information carried by the sawtooth wobble. The detector 50 includes a low-pass filter 51, a comparator 52, and a detecting unit 53. The low-pass filter 51 receives a wobble signal and outputs a filtered signal. The comparator 52 compares the wobble signal with the filtered signal and outputs a compared signal. The detecting unit 53 generates a bit signal to represent the bit information carried by the sawtooth wobble according to the duty cycle of the compared signal. To speak more specifically, when the duty cycle of the compared signal is greater than a predetermined value, e.g. 50%, the bit signal is set to a first value representing logic one. Otherwise, when the duty cycle of the compared signal is less than the predetermined value, the bit signal is set to a second value representing logic zero.

The detecting unit 53 can use a counter (not shown) to count the pulse numbers of a counting clock during a high level period and a low level period of the compared signal. The counting clock is a high-frequency clock having a frequency higher than the wobble signal. Thus, the duty cycle of the compared signal can be calculated according to the counted pulse numbers. The implementing method of the detecting unit 53 using the counter is well known to one of ordinary skill in the art, and detailed descriptions thereof will be omitted.

Figure 6A:
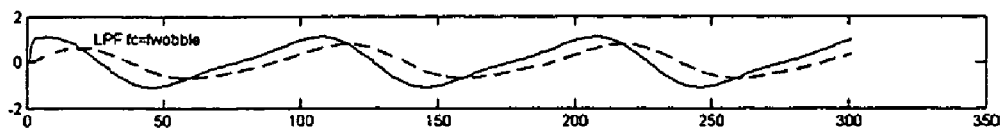
FIG. 6A shows the wobble signal and the corresponding filtered signal after the wobble signal passes through the low-pass filter with $f_c = f_{wob}$.
Figure 6B:
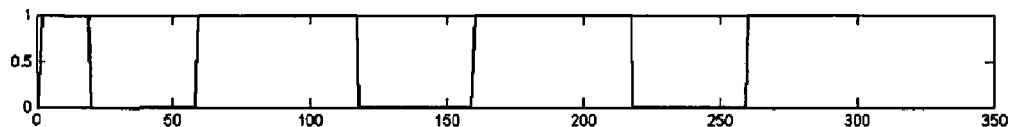
FIG. 6B shows the output of FIG. 6A and the compared signal of the comparator by comparing the signals of FIG. 6A.
Figure 6C:
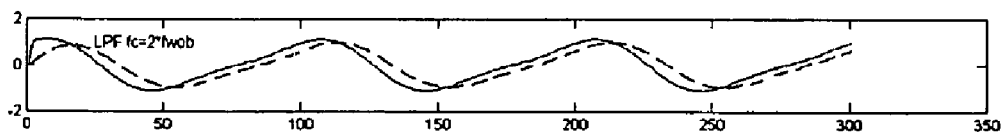
FIG. 6C shows the wobble signal and the corresponding filtered signal when the wobble signal passes through the low-pass filter with $f_c=2*f_{wob}$.
Figure 6D:
FIG. 6D shows the output of FIG. 6C and the compared signal of the comparator by comparing the signals of FIG. 6C.
Figure 6E:
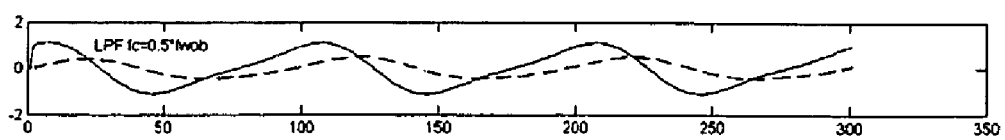
FIG. 6E shows the wobble signal and the corresponding filtered signal when the wobble signal passes through the low-pass filter with $f_c=0.5*f_{wob}$.
Figure 6F:
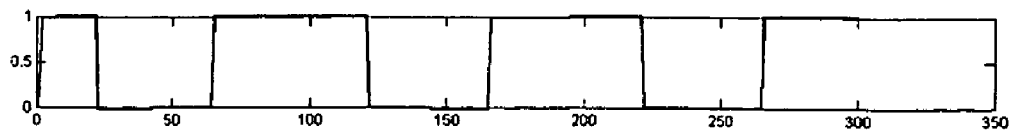
FIG. 6F shows the output of FIG. 6E and the compared signal of the comparator by comparing the signals of FIG. 6E.

FIG. 6A shows the wobble signal and the filtered signal generated from the low-pass filter 51 of FIG. 5 with the 3 dB frequency $f_c=f_{wob}$, wherein the solid line represents the wobble signal while the dashed line represents the filtered signal. FIG. 6B shows the compared signal of the comparator 52 by comparing the signals of FIG. 6A. FIG. 6C shows the wobble signal and the filtered signal of the low-pass filter 51 of FIG. 5 with the 3 dB frequency $f_c=2*f_{wob}$, wherein the solid line represents the wobble signal while the dashed line represents the filtered signal. FIG. 6D shows the compared signal of the comparator 52 by comparing the signals of FIG. 6C. FIG. 6E shows the wobble signal and the filtered signal of the low-pass filter 51 of FIG. 5 with the 3 dB frequency $f_c=0.5*f_{wob}$, wherein the solid line represents the wobble signal while the dashed line represents the filtered signal. FIG. 6F shows the compared signal of the comparator 52 by comparing the signals of FIG. 6E.

The bit values represented by the wobble signals in FIGS. 6A, 6C, and 6E are all logic one, so the duty cycles of the compared signals in FIGS. 6B, 6D, and 6F are all greater than 50%. As such, it is shown that the detecting unit 53 is capable of recovering the information carried by the sawtooth wobble by detecting the duty cycle of the compared signal. Moreover, from FIGS. 6A to 6F, it is found that the detecting unit 53 still perform well even the 3 dB frequency $f_c$ of the low-pass filter is varying from $0.5*f_{wob}$ to $2*f_{wob}$. So, it can be seen that the functionality of the detecting unit 53 is not sensitive to the setting of the 3 dB frequency $f_c$ of the low-pass filter. This property makes the practical circuit design of the low-pass filter become very easy because merely the typical resistors and capacitors are enough for realistic implementation.

Figure 7:
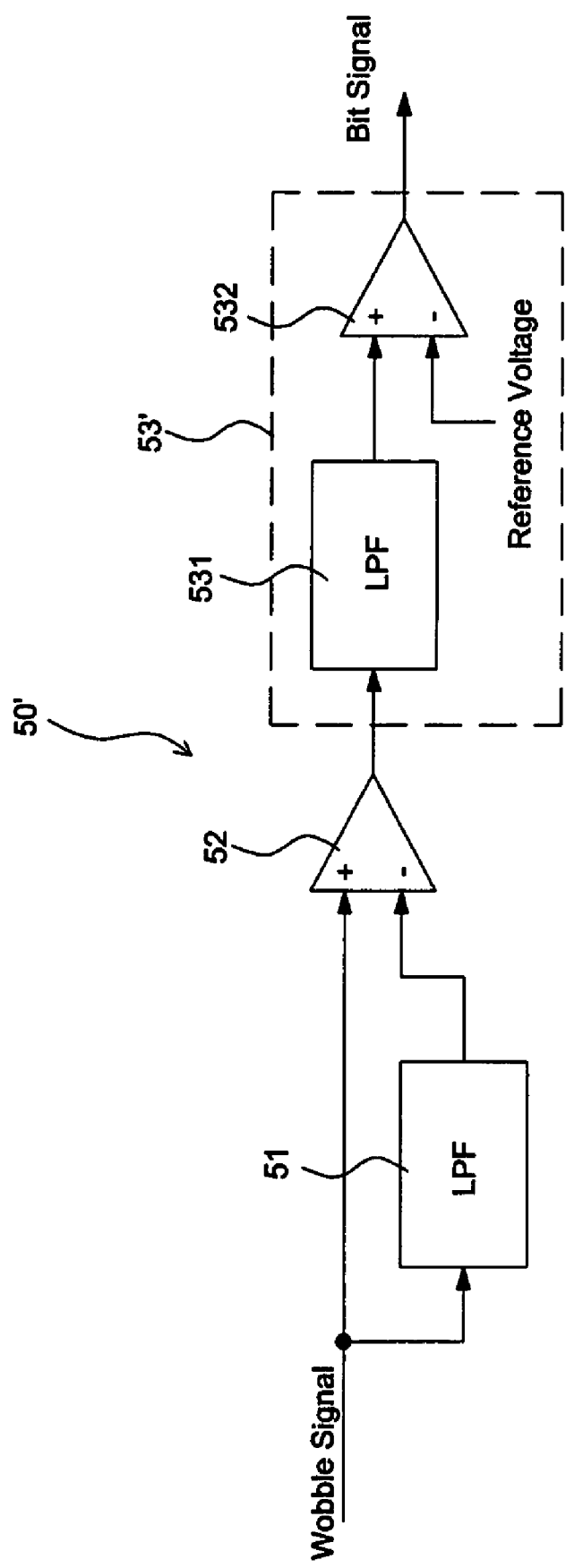
FIG. 7 illustrates a block diagram of the detector for detecting the information carried by sawtooth wobble according to a second embodiment of the invention.

FIG. 7 illustrates a block diagram of the detector for detecting the information carried by sawtooth wobble according to a second embodiment of the invention. Referring to FIG. 7, the detector 50' includes a low-pass filter 51, a comparator 52, and a detecting unit 53'. The detecting unit 53' includes an averaging unit 531 and a level detecting unit 532. In practical implementation, the averaging unit can be a second low-pass filter. Recall that when the detecting unit 53 is implemented by the way shown in FIG. 5, a high-frequency counting clock is required for counting the duty cycle of the compared signal. However, instead of involving the high-frequency counting clock, this embodiment utilizes the averaging unit 531 and the level detecting unit 532 to implement the detecting unit 50'. The averaging unit 531 receives the compared signal outputted by the comparator 52, and generates an average signal, which reflects the average level of the compared signal and is substantially proportional to the duty cycle of the compared signal. The level detecting unit 532 compares the average signal with a reference voltage. When the level of the average signal is greater than the reference voltage, it implies that the duty cycle of the compared signal is greater than the predetermined duty cycle and the corresponding bit information is determined to be login one. On the contrary, when the level of the average signal is smaller than the reference voltage, it implies that the duty cycle of the compared signal is smaller than the predetermined duty cycle, and the corresponding bit information is determined to be logic zero.

Figure 8A:
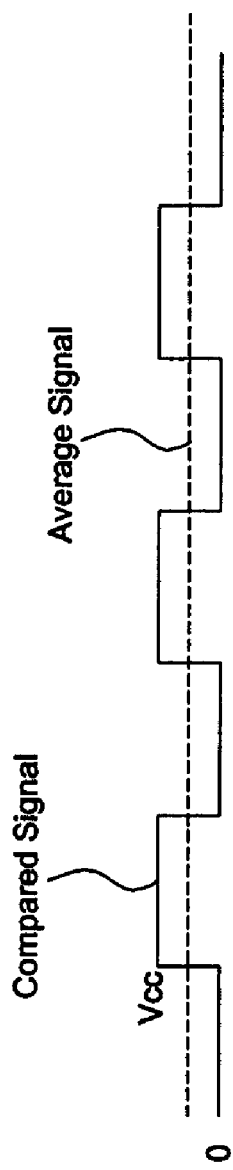
FIGS. 8A to 8C show the three exemplary waveforms of the compared signals and the corresponding average signals.
Figure 8B:
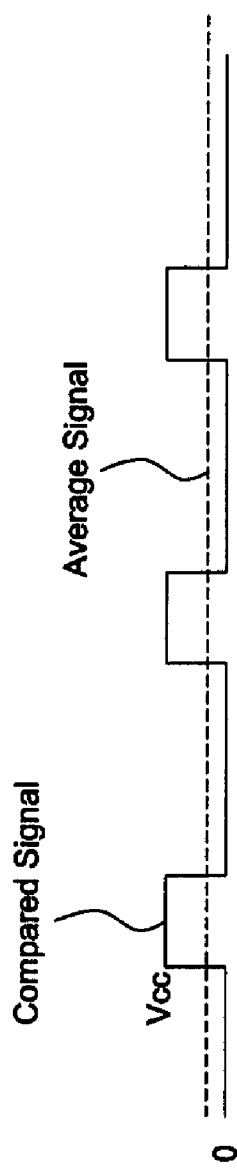
Figure 8C:
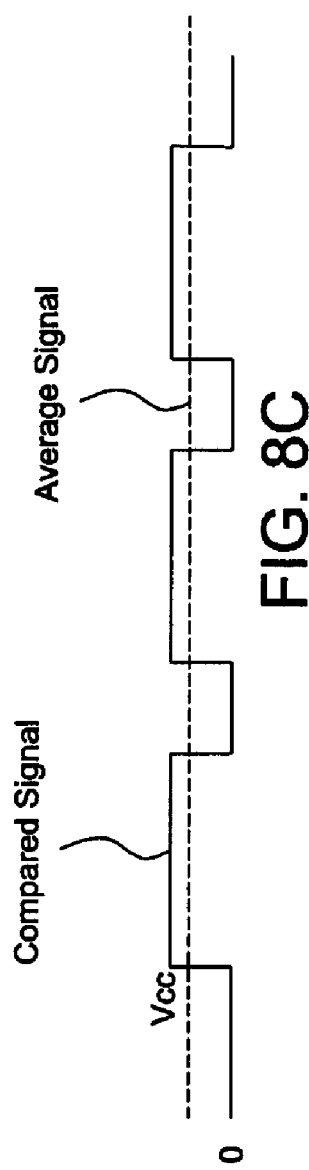

FIGS. 8A to 8C show three exemplary waveforms of the compared signals and the corresponding average signals, wherein the duty cycle of the signal in FIG. 8A is about 50%, the duty cycle of the signal in FIG. 8B is smaller than 50%, and the duty cycle of the signal in FIG. 8C is greater than 50%. It can be easily seen that the reference voltage can be set to Vcc/2, where Vcc denotes the high level voltage of the compared signal and the low level voltage of the compared signal is zero.

Figure 9A:
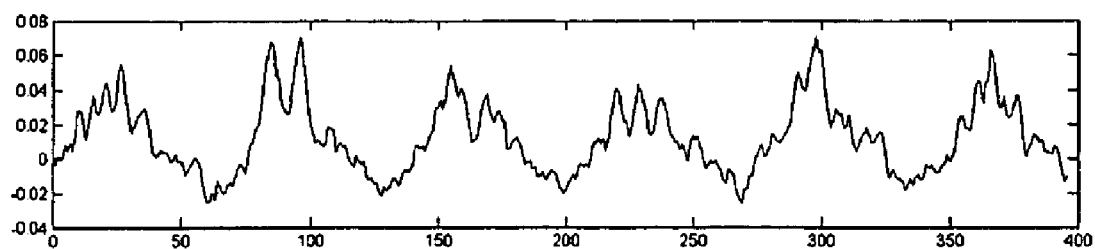
FIG. 9A shows the original wobble signal acquired from the disc.
Figure 9B:
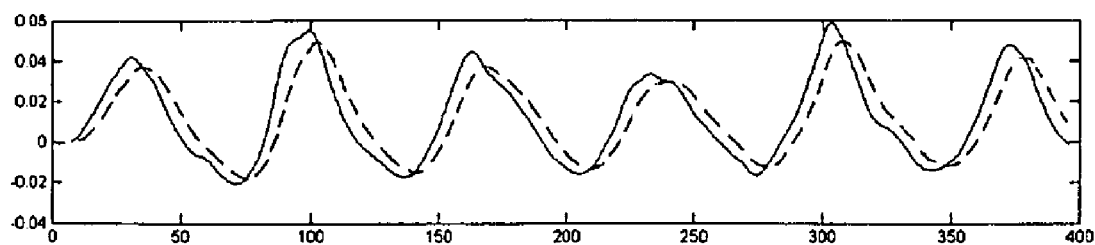
FIG. 9B shows the wobble signal and the corresponding filtered signal outputted from the first low-pass filter
Figure 9C:
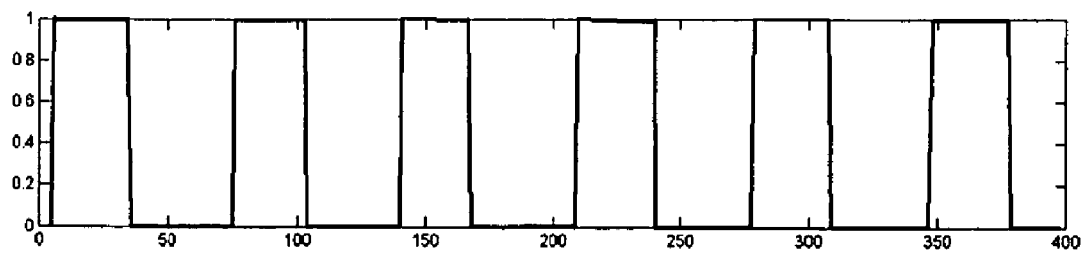
FIG. 9C shows the corresponding compared signal.

FIG. 9A shows the original wobble signal acquired from the disc, which typically contains not only the wanted wobble signal but also the high-frequency noise. FIG. 9B shows the wobble signal and the corresponding filtered signal outputted by the low-pass filter 51, wherein the wobble signal is obtained by filtering the original wobble signal for suppressing the high-frequency noise. And FIG. 9C shows the corresponding compared signal. In FIG. 9B, the solid line represents the wobble signal which is obtained by low-pass filtering (not shown) the original wobble signal for filtering out the high-frequency noise, and the dashed line represents the filtered signal which is outputted by the low-pass filter 51. The bit information carried by the sawtooth wobble shown in FIG. 9B is logic zero, the corresponding duty cycle of the compared signal should be less than 50%, which can be seen in FIG. 9C as expected.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. A detector for detecting information carried by a signal having a sawtooth-like shape, the detector comprising:
    a filter for receiving a wobble signal and filtering the wobble signal to generate a filtered signal;
    a comparator for comparing the wobble signal with the filtered signal and generating a compared signal; and
    a detecting unit for receiving the compared signal and generating a bit signal according to a duty cycle of the compared signal;
    wherein the bit signal is set to a first value when the duty cycle of the compared signal is greater than a predetermined value, and the bit signal is set to a second value when the duty cycle of the compared signal is smaller than the predetermined value.

2. The detector according to claim 1, wherein the filter is a first low-pass filter with a 3 dB frequency roughly close to an inverse of a time period during which the wobble signal carries a bit information.

3. The detector according to claim 1, wherein the predetermined value is 50%.

4. The detector according to claim 1, wherein the detecting unit comprises:
    an averaging unit for receiving the compared signal and generating an average signal; and
    a level detecting unit for receiving the average signal and generating the bit signal;
    wherein the bit signal is set to the first value when the level of the average signal is greater than a reference voltage, and the bit signal is set to the second value when the level of the average signal is smaller than the reference voltage.

5. The detector according to claim 4, wherein the first value represents a logic one and the second value represents a logic zero.

6. The detector according to claim 4, wherein the averaging unit is a second low pass filter.

* * * * *